Dec. 29, 1931.  R. W. SCHROEDER  1,838,194
AIRPLANE
Filed Sept. 10, 1927    6 Sheets-Sheet 1
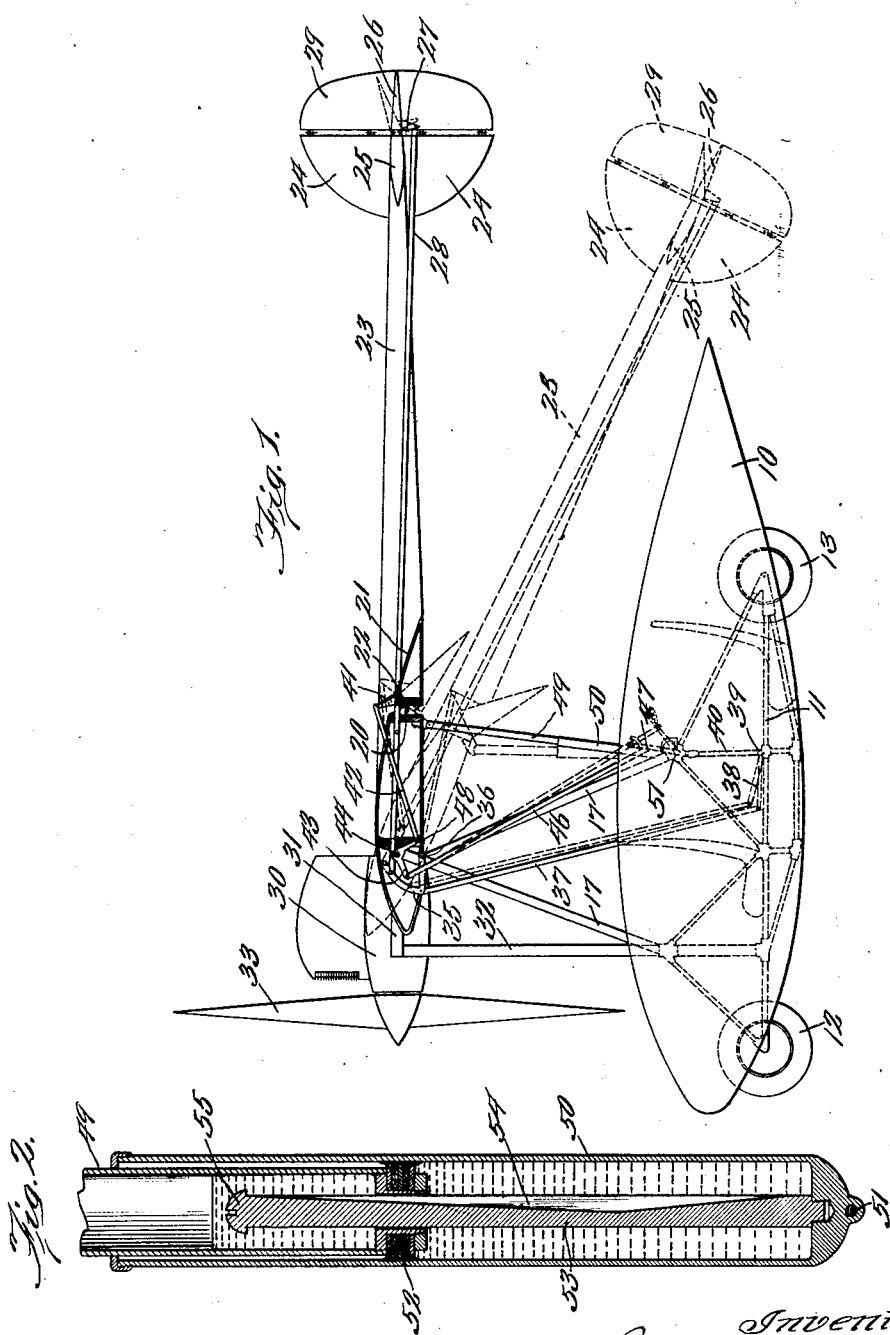

Dec. 29, 1931.  R. W. SCHROEDER  1,838,194
AIRPLANE
Filed Sept. 10, 1927  6 Sheets-Sheet 2
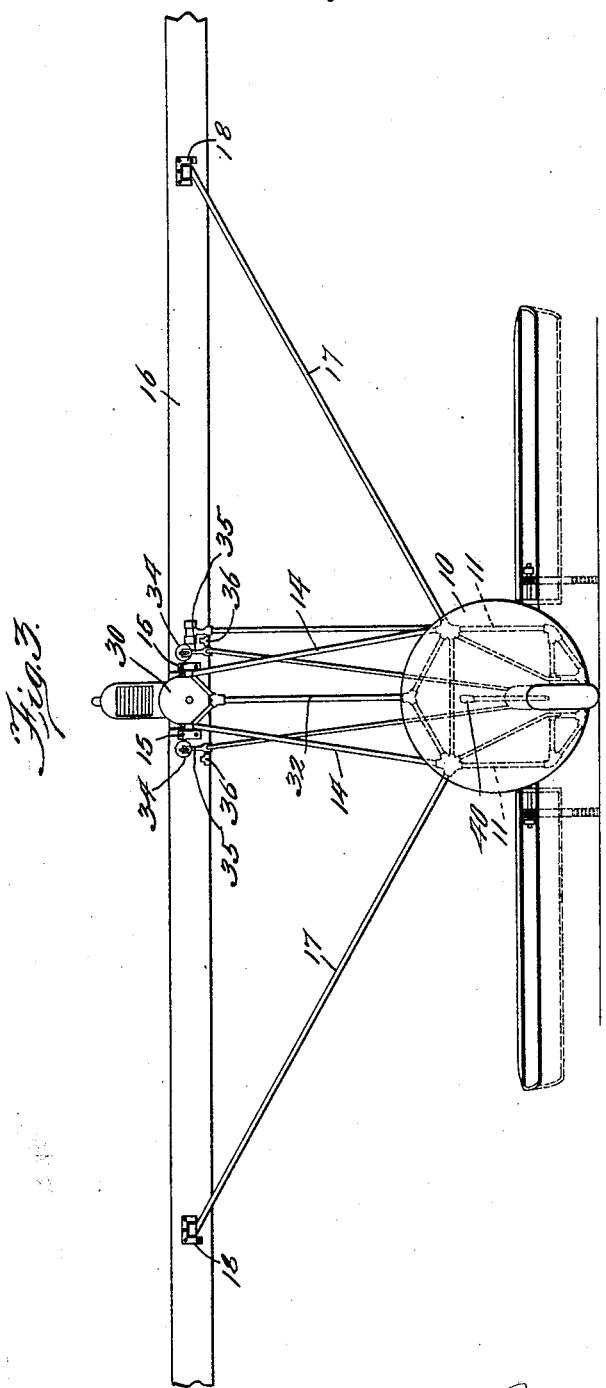
Inventor:
Rudolph W. Schroeder
By Nissen & Crane
Attys Dec. 29, 1931.  R. W. SCHROEDER  1,838,194
AIRPLANE
Filed Sept. 10, 1927   6 Sheets-Sheet 3
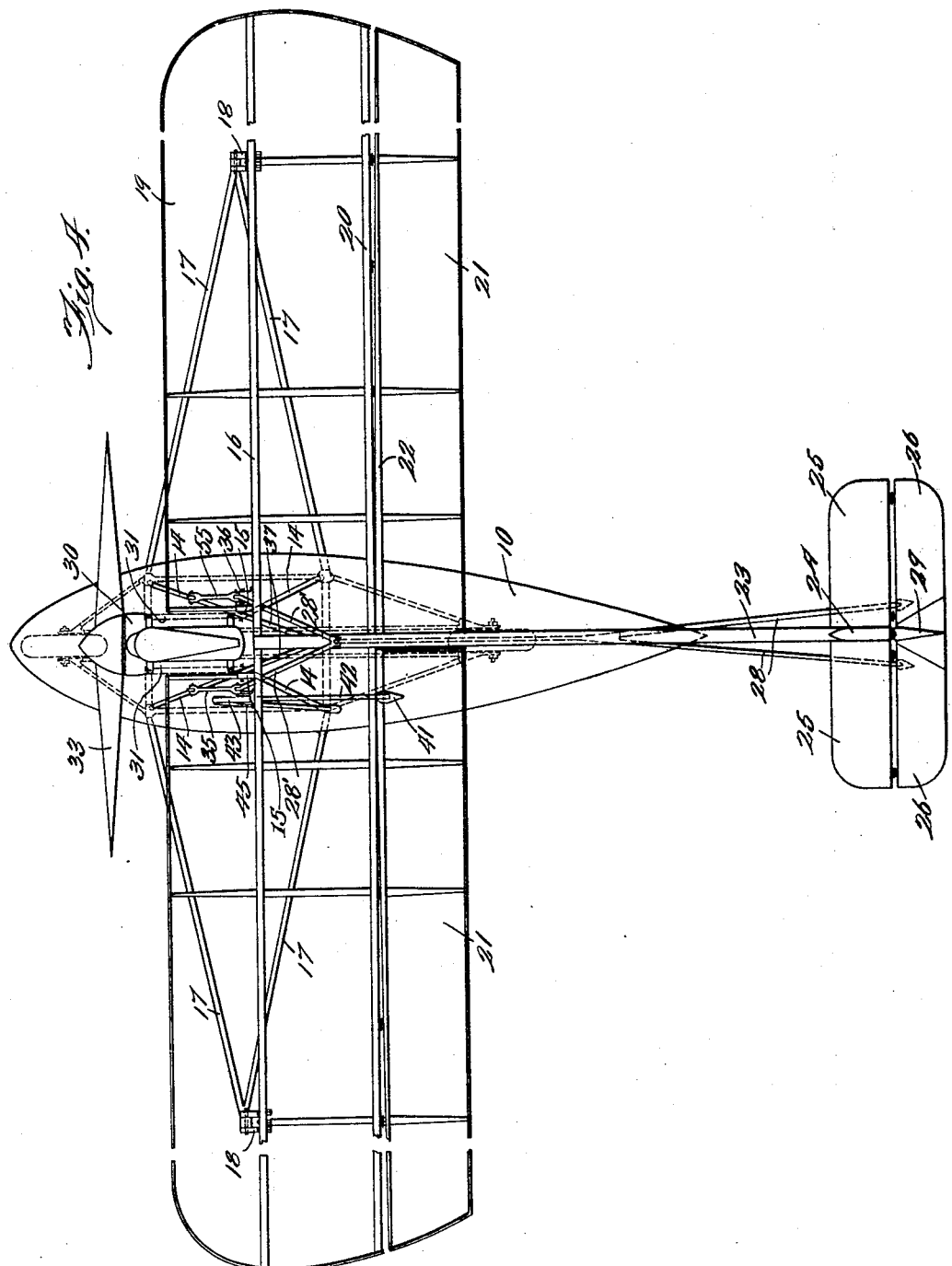

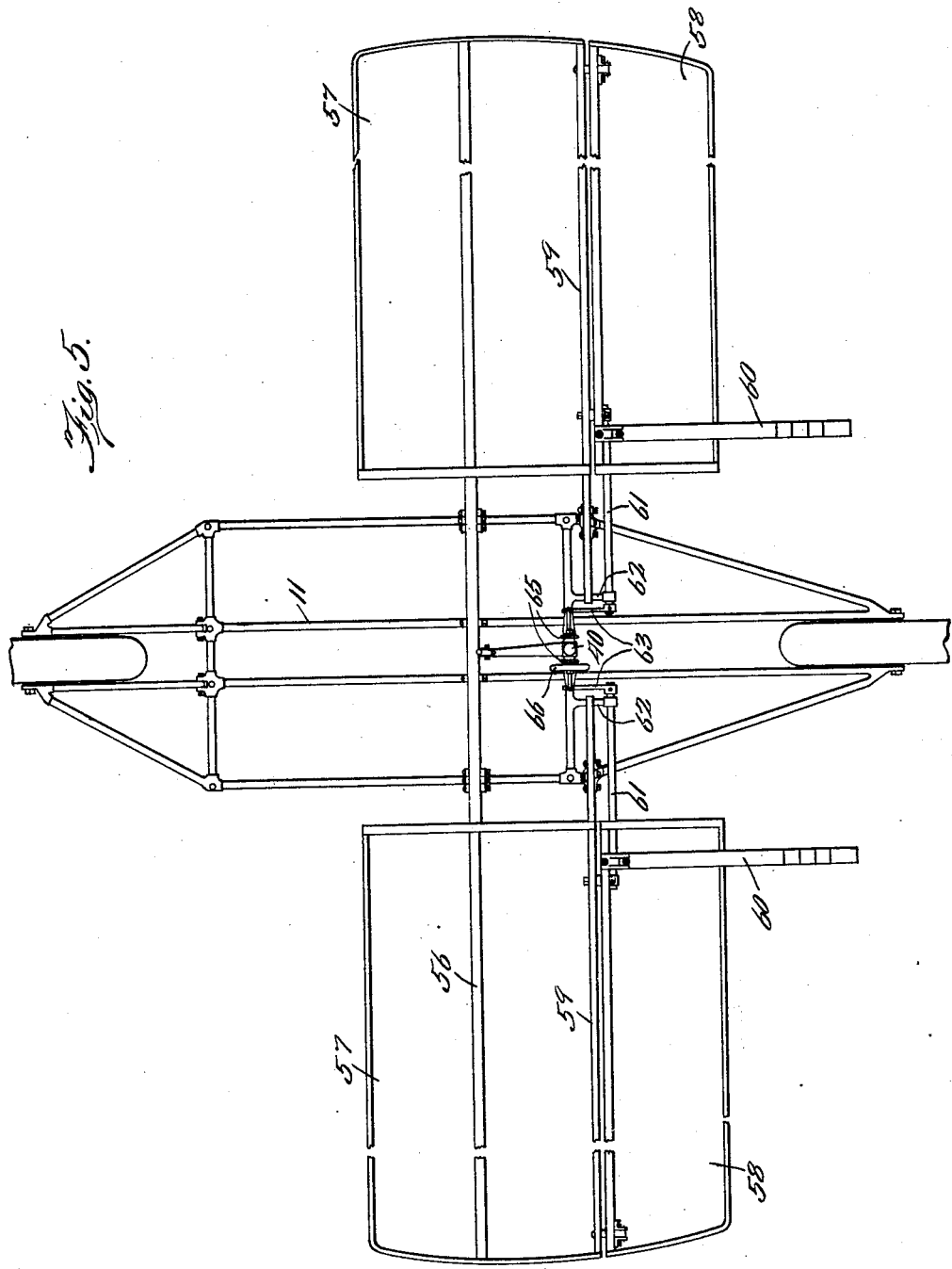

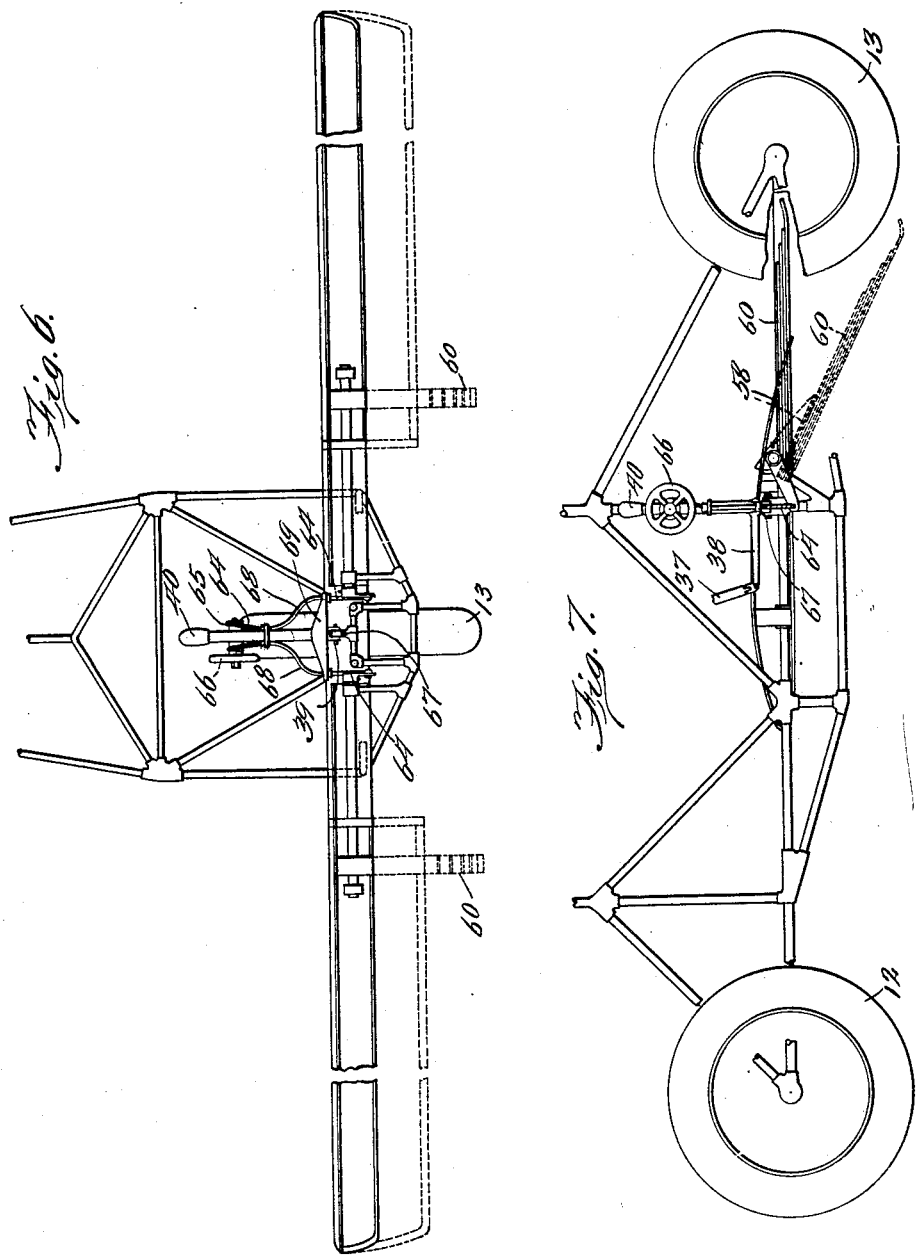

Dec. 29, 1931.  R. W. SCHROEDER  1,838,194
AIRPLANE
Filed Sept. 10, 1927   6 Sheets-Sheet 6
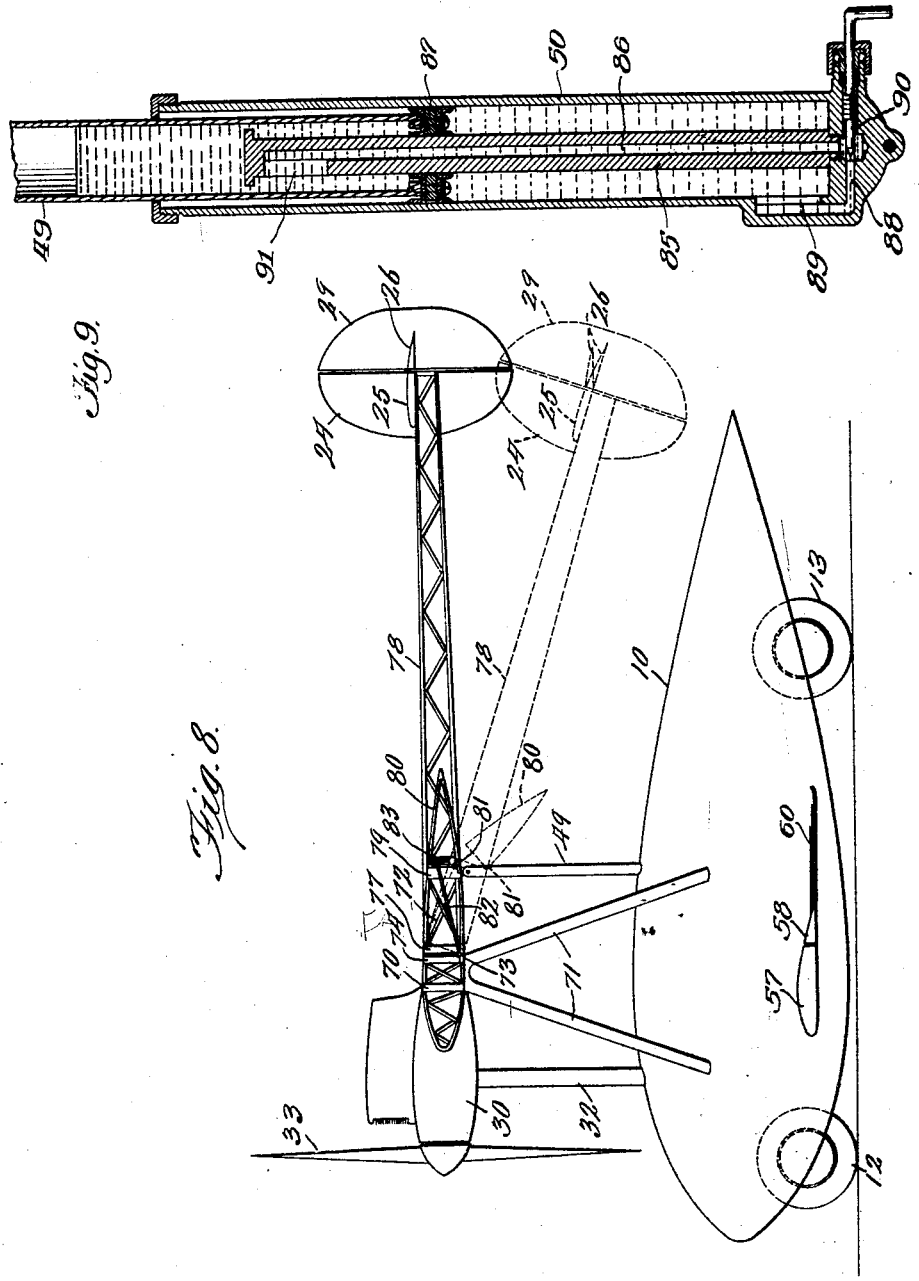
Inventor:
Rudolph W. Schroeder
By Nissen & Crane
Attys Patented Dec. 29, 1931

1,838,194

UNITED STATES PATENT OFFICE

RUDOLPH W. SCHROEDER, OF GLENCOE, ILLINOIS

AIRPLANE

Application filed September 10, 1927. Serial No. 218,672.

One object of the present invention is to provide an airplane construction in which the supported weight will produce a stabilizing effect and also act to operate certain of the air foils to control the movements of the ship.

A further object is to provide a construction in which principal forces to which the airplane is subjected act at a common axial position on the wing, thus avoiding instability from variations in the relative strength of these forces and producing the effect of translating the center of gravity, center of resistance of the supported load, and center of propeller thrust to a common axis, parallel, and about the maximum forward position of the center of air pressure on the wing.

A further object is to provide a construction having a member which will automatically assume a definite relation to the horizontal, thus establishing a level to which the controls may be related.

A further object is to utilize the supported weight as a pendulum for operating the controls for the plane.

A further object is to provide a construction having minimum air resistance.

A further object is to provide an airplane construction in which the body will retain a substantially horizontal position at all times.

A further object is to provide an airplane in which landing may be effected with a maximum of ease and a minimum of danger.

A further object is to provide an airplane in which take-off may be effected in a short space and without danger.

A further object is to provide an airplane having laterally controlled retractible skids.

Other objects and advantages will appear from the following description.

The invention is exemplified in the combination and arrangement of parts shown in the accompanying drawings and described in the following specification, and it is more particularly pointed out in the appended claims.

In the drawings:—

Fig. 1 is a side elevation of an airplane having one embodiment of the present invention applied thereto.

Fig. 2 is a longitudinal sectional view of a dashpot construction forming a detail of the present invention.

Fig. 3 is a front elevation of the machine shown in Fig. 1.

Fig. 4 is a top plan view of the machine shown in Fig. 1, with the wing covering omitted.

Fig. 5 is a somewhat diagrammatic top plan view of the body frame and wing skid.

Fig. 6 is a front elevation with parts omitted, showing the control for the wing skid.

Fig. 7 is a side view of the mechanism show in Figs. 5 and 6.

Fig. 8 is a view similar to Fig. 1 showing a modified form of the invention.

Fig. 9 is a view similar to Fig. 2 showing a modified form of dash-pot.

In the drawings, the numeral 10 designates the body of an airplane, which is supported on a skeleton framework 11 and is preferably of stream line shape. Landing wheels 12 and 13 are journaled on the framework 11 at the front and rear ends thereof and are largely housed within the contour of the body 10 as shown in Fig. 1, but extend down a sufficient amount to support the body upon a level surface. Two pairs of strut members 14 project upwardly from the frame 11, as shown best in Fig. 3, and are pivotally connected to brackets 15 attached to the main wing spar 16. Two additional pairs of strut members 17 extend upwardly and outwardly from the frame 11 and are pivotally connected to brackets 18 secured to the spar 16 at outwardly spaced positions thereon as shown also in Fig. 4. Each pair of strut members, as shown in Figs. 1 and 4, constitutes an inverted V-shaped support for the body 10, and the pivotal axis of the strut members is in a straight line just in front of the main spar 16. It will be apparent that the body 10 and the parts carried thereby are suspended from a pivotal axis running longitudinally of the main spar 16. The wing 19 is of usual high lift shape and is supported by the main spar 16 and a rear spar 20. A rear wing flap 21 is pivoted to the rear spar 20 and extends rearwardly to complete the wing section. The flap 21 is provided with a longitudinally extending spar 22, which is pivoted to the spar 20 to provide pivotal connection between the wing and flap. A tail boom 23 is rigidly connected with the main wing section and carries at its rear end vertical fins 24 and horizontal fins 25. Tail flaps 26 are pivoted to the horizontal fins 25 and are provided with downwardly extending arms 27, to which control rods 28 are pivotally connected. A vertical tail piece 29 is pivoted to the fins 24 and is controlled in any approved way for guiding the lateral movement of the ship. The engine 30 is rigidly mounted on the frame 11 by means of bars 31 supported at their rear ends on the struts 14 and at their forward ends on a strut 32 extending upwardly from the frame 11. The propeller 33 is connected to the engine shaft at the front of the engine 30. It will thus be apparent that the engine and propeller have a fixed relation to the frame 11 and body 10. The front edge of the wing 19 is cut away to permit oscillation of the wing relative to the engine when the body 10 swings upon its pivotal support. The control rods 28 extend forwardly and are connected to a yoke 28' having branches extending through openings 34 in the main spar 16 and are attached at their forward ends to segment members 35, which are pivotally mounted at 36 on the front face of the main spar 16. Links 37 are connected to the segment members 35 and have their lower ends pivotally connected to an arm 38 pivotally supported at 39 on the frame 11. The arm 38 is fixed to a handle 40 by means of which the arm 38 may be operated to move the tail flap 26 up or down. The wing flap 21 is provided with an upwardly extending fingers 41 pivotally connected at its upper end to a link 42. The forward end of the link 42 is connected to a bell crank 43 pivoted at 44 on a bracket 45 secured to the main spar 16. The pivotal axis 44 preferably coincides with the pivotal axis of the struts 14 and 17. The bell crank 43 is connected by a link 46 with a hand lever 47 mounted on the frame 11. The hand lever 47 may be shifted and locked in its adjusted positions to change the pivotal point 48 at which the link 42 is connected to the bell crank 43.

A strut 49 is fixed to the rear spar 20 and extends downwardly into a cylinder 50 pivotally mounted at 51 on the frame 11. The cylinder 50 forms a dashpot for controlling the movement of the body 10 upon its pivotal axis.

The construction of the dashpot is shown more clearly in Fig. 2. As shown in that figure the strut 49 is hollow and carries a piston 52 at its lower end which fits the interior of the cylinder 50. A metering pin 53 is secured to the lower end of the cylinder 50 and extends through a perforation in the piston 52. The interiors of the cylinder 50 and strut 49 are supplied with oil or other liquid to control the movement of the strut 49. A longitudinal groove 54 is formed in the pin 53 to permit passage of oil back and forth between the strut 49 and piston 50. The rate of movement of the piston will be determined by the passage of oil in the slot 54 through the piston 52. The slot varies in depth as shown in Fig. 5 and has its greatest depth at the position the piston will occupy when the wing is approximately parallel with the axis of the body 10. The minimum resistance is offered to relative movement of the wing and body at this position, but as the piston approaches the opposite ends of its travel the slot becomes shallow so that the movement of the piston is retarded and does not come to a sudden stop at either end of its stroke. The amount of movement is positively limited, however, by the head 55 on the pin 53 and by the bottom of the cylinder 50.

Projecting laterally from the frame 11, as shown in Figs. 5, 6 and 7, is a spar 56, which supports stub wings 57 at each side of the body 10. The stub wings 57 have rear flaps 58 pivotally mounted on the rear spars 59 of the stub wings. Skids 60 are fixed on the wing flaps 58 and are also rigidly secured to shaft 61, which are journaled in brackets 62 on the frame 11. Arms 63 are fixed to the inner ends of the shafts 61 and cords 64 extend upwardly from the ends of the arms 63 to drums 65 carried on the hand lever 40. The drums 65 are fixed to a common shaft provided with a hand wheel 66. When the machine is in flight the rear flaps 58 will lift the skids 60 so that they will trail directly behind the stub wings and offer practically no resistance to flight. When it is desired to lower the skids the hand wheel 66 is rotated to wind the cords 64 on their respective drums and thus rotate the shafts 61 to move the skids downwardly for landing purposes or to hold the plane from tilting laterally when at rest. It may sometimes be desirable to lower one of the skids 60 to a greater extent than the other, as for instance, when the plane touches on the ground in a side wind. In order that this may be done the handle 40 is provided with a pivotal joint 67 which permits the handle to be swung laterally. The cable 64 extends downwardly through guide brackets 68, which are spaced apart at their lower ends by a cross yoke 69, as shown best in Fig. 6. When the handle 40 is tilted laterally, one of the cables 64 will be tightened and the other loosened, thus lowering one of the skids 60 and permitting the other to rise. In landing, the skids are depressed and at the same time the rear flaps 58 will also be depressed, thus offering additional lift due to the ground effect on the air which the flaps force downward, and, consequently, slower landing and take-off speeds are possible.

When the machine is at rest the tail boom 23 will gravitate to the position shown in broken lines in Fig. 1. When the engine is started the air stream from the propeller will tend to raise the tail to the position shown in full lines in Fig. 1. This may be augmented, if necessary, by depressing the tail flap 26. The forward movement of the machine will also help to sustain the tail piece in horizontal position. In starting off minimum resistance is offered to the movement of the ship from the start, because of the horizontal position of the wing and body. This permits a lifting speed to be attained in a minimum distance. When a sufficient speed has been reached, the pilot moves his stick 40 backwardly toward him which lifts the segment 35, moving the rods 28 rearwardly and lifting the tail flap 26 to the position shown in broken lines in Fig. 1. In this position, the air stream depresses the tail and lifts the front edge of the wing to a position of attack tending to lift the plane. The frame and body of the ship retain their horizontal position so that there is no increase in air resistance due to a change in the position of the body of the ship. In standard airplanes as heretofore constructed it is necessary to tilt the front of the body upwardly during ascent, which materially retards the forward movement because of the added resistance occasioned by the angular position of the body of the ship. In the present construction, in ascent, the body of the ship will remain substantially level so that it is not exactly parallel with the line of movement, but the upper component of the movement is so slight compared to the forward component that the added resistance is much less than is occasioned in the previous constructions by the upward angle of the ship body. The rear edge of the wing tilts downwardly about the pivotal axis 44, while the pivotal connection between the link 42 and finger 41 moves about the pivotal center 48. This will throw the finger 41 rearwardly and depress the rear flap of the wing toward the position shown in broken lines in Fig. 1, thus increasing the lifting effect of the wing. This movement of the wing flap is produced automatically by the relative elevating movement of the frame and wing. After the plane has reached the desired height, the pilot levels off by moving his stick forwardly in the usual way. This levels out the tail flap 26 so that the tail is permitted to rise to a horizontal position. At the same time the rear wing flap will be straightened out, decreasing the lifting effect of the wing and at the same time decreasing the resistance to forward movement.

When the pilot desires to descend he simply shuts off the engine and glides. The ship will gradually sink due to the action of gravity and this will cause the tail to rise slightly relative to the horizontal so that the wing is inclined downwardly and the tail is slightly raised during the descent. It is desirable to maintain a sufficient rate of speed so that the plane will respond to movement of the controls until the plane is straightened out close to the surface of the landing field. With the present form of body support the body will always be level so that if the plane should strike the earth while still traveling at a considerable rate of speed there is not nearly so great danger of nosing over as there is with planes heretofore constructed. With the present construction, however, when the ship is near the surface of the landing field, the tail may be lowered to impart maximum lift to the machine at the minimum speed so that the plane may be sustained above the surface of the landing field until the momentum is mostly spent. At the time the machine sets on the speed will be reduced to such an extent that the danger of landing is greatly decreased. The tail may be lowered without raising the front of the machine so that a high landing gear is not required as in the present machines. In landing, it is desirable, of course, to have as great a lifting angle as possible. In machines heretofore built this requires a high landing gear if the landing wheels are far enough forward to prevent nosing over. A high landing gear, on the other hand, makes it difficult to take off for the reason that the whole machine is tipped back and offers a greater resistance to forward movement until the tail is raised, and the tail cannot be raised until a high speed is attained since the body and tail are fixed together and it is necessary therefore for the tail planes to carry a considerable part of the total weight of the ship. In the present construction, the tail can be raised and lowered at will without changing the angle of the body of the machine so that the high landing gear is dispensed with. The necessary speed in taking off may be attained much more readily and a greater lift at a lower speed can be maintained in landing. When the plane is gliding in for the landing, the pilot will lower the skids 60 so that they will trail upon the surface of the field and at the same time the wing flaps 58, being lowered, offer the additional lift due to their change in wing shape and to the effect of the ground to the air flow downward from the stump wings. Before landing, he may move the lever 47 backwardly to swing the rear wing flap 21 downwardly, thus increasing the lift of the wing in addition to that automatically obtained at the time that he lands or takes off.

In the modified form of the invention shown in Fig. 8, the construction is similar to that heretofore described except that the wing is made in three sections rather than two. The front section 70 is rigid with the strut members 71, which correspond to the strut members 14 and 17 of the form previously described. The central section 72 is pivoted to the front section at 73, the two sections being provided with spars 74 and 75, respectively, pivoted together at their lower edges. The tail boom 78 is fixed to the spars 77 and 79 of the central wing section. The dashpot connection 49 is connected to the rear of the central wing section in the same manner as in the form previously described. The rear flap 80 is pivoted at 81 to the rear of the central wing section. A rod 82 is pivoted at 73 on the pivotal support for the frame and also at 83 on the wing flap at a point spaced upwardly from the pivotal axis 81. When the tail is moved downwardly for ascent the front of the wing will retain its horizontal position because of the pendulum action of the suspended body. The central section of the wing will be moved downwardly and the rear flap will be swung downwardly still further because of the rod 82. This will change the contour of the wing, giving it a greater lifting effect with a minimum increase of resistance to forward movement. The pendulum support of the body is thus utilized for changing automatically the wing contour to produce the greatest lifting effect when this is desired for ascent or descent. The pivotal attachment 83 is preferably adjustable so that the amount of movement of the rear wing flap can be charged to secure the best results.

The position and movements of an airplane in flight are necessarily referred at all times to the horizontal. The behavior of the plane will depend upon its position relative to a horizontal plane. The operator, however, is removed from the surface of the earth so that he has no established horizontal plane to which he may refer for observing the position of his ship. The present invention, however, provides means for automatically determining the horizontal. Since the body of the ship is supported like a pendulum, it automatically swings into a substantially horizontal position. The operator may therefore relate the angle of ascent or descent to the longitudinal axis of the ship as an established horizontal so that he may gauge his flight naturally relative to an established horizontal base line. Thus, the suspended position of the ship's body is not only of great assistance in taking off and landing but also during flight.

A modified form of dash-pot construction is shown in Fig. 9 in which a center pin 85 is secured to the bottom of the cylinder 50 and is provided with a longitudinal opening 86. The plunger 49 is provided with a piston 87 which makes tight contact with the inner wall of the cylinder 50 and the outer surface of the pin 85. A by-pass 88 connects the passage 86 with the interior of the cylinder 50 below the piston 87. The by-pass 88 is provided with a relatively long, narrow slot 89 forming a port between the by-pass and the interior of the cylinder. A needle valve 90 is provided for regulating the rate of flow of fluid between the interior of the cylinder 50 and the passage 86. The valve may be closed to completely stop flow of fluid through the by-pass 88. At the top of the pin 85 is an elongated, narrow slot 91 forming a port between the passage 86 and the interior of the plunger 49. It is apparent that the form of dashpot shown in Fig. 9 permits the operator to regulate the speed of relative movement between the tail and body of the machine and to close the valve 90 so as to prevent the pivotal movement of the car body relative to the wing and tail. In some cases, it may be desirable to lock the parts in a fixed position relative to each other, as, for instance, in continuous horizontal flying. Furthermore, by regulating the opening through the by-pass 88, the damping effect of the dashpot upon the relative movement of the car body and tail can be regulated to suit conditions. The slots 89 and 91 will be gradually closed by the piston as it approaches either extremity of its range of movement, thus gradually arresting relative movement of the parts and preventing sudden shock at the limits of movement.

I claim:—

1. An airplane comprising a wing, means for changing the inclination of said wing to the horizontal, a pendulum member supported from said wing, and means operated by said pendulum member for changing the contour of said wing when the inclination of said wing is changed relative to the horizontal.

2. An airplane comprising a wing, a tail connected with said wing, means on said tail for changing the inclination of said wing to the horizontal, a car body pivotally suspended from said wing for movement fore and aft relative to said wing, and means controlled by the pivotal movement of said car body for changing the contour of said wing when the inclination of said wing to the horizontal is changed.

3. An airplane comprising a wing, a body member suspended from said wing for fore and aft pivotal movement relative to said wing, a tail having an air foil thereon for changing the inclination of said wing, said wing having a rear flap, and means operated by relative movement of said body member and wing for moving said rear flap relative to said wing.

4. An airplane comprising a wing having a rear flap pivotally mounted thereon, a tail fixed to said wing and having a movable tail flap, a body member pivotally suspended from said wing, manually controlled means for shifting said tail flap to change the inclination of said wing, and means operated by the relative movement of said wing and body member for shifting the rear wing flap relative to said wing.

5. An airplane comprising a wing, a body member pivotally suspended from said wing for fore and aft movement, said wing having a rear flap pivoted thereon, a tail fixed to said wing and having a movable tail flap, manually operated means for shifting said tail flap to change the inclination of said wing, means operated by the relative pivotal movement of said wing and body for shifting the rear wing flap, and manually operated means for shifting said rear wing flap.

6. An airplane comprising a wing, a car body pivotally suspended from said wing for fore and aft movement, and a damping device for restraining relative fore and aft movement of said body relative to said wing and having skids pivoted thereto.

7. An airplane comprising a wing, a car body pivotally suspended from said wing for fore and aft movement relative thereto, and a damping device for restraining relative pivotal movement of said wing and car body, said damping device being arranged to exert graded restraint gradually increasing toward the opposite limits of movement of said wing and body relative to each other.

8. An airplane comprising a wing, a car body pivotally suspended from said wing for fore and aft movement, a dash-pot for restraining relative pivotal movement of said wing and car body and for limiting the extent of said movement, said dash-pot being arranged to exert gradually increasing restraint as said car body and wing approach opposite limits of their relative movement.

9. In an airplane, a car body, a pair of landing wheels disposed one in the rear of the other and in central position transversely of said car body, a pair of stub wings projecting laterally from said car body and having rear flaps pivoted thereto, landing skids spaced laterally from said landing wheels and fixed to said flaps, and means for depressing said skids and flaps to bring said skids into position to engage the surface of a landing field.

10. In an airplane, a car body, a pair of landing wheels disposed in a longitudinal central plane of said car body, landing skids spaced laterally relative to said landing wheels, and means for depressing said skids different amounts.

11. In an airplane, a car body, landing wheels journaled on said car body at the central longitudinal plane thereof, stub wings projecting laterally from said car body, rear flaps pivoted on said stub wings, landing skids spaced from said landing wheels and fixed to said rear flaps, and means for depressing said rear flaps and skids, said depressing means being arranged to permit said skids to be moved downwardly different amounts.

12. An airplane comprising a wing, a car body pivotally suspended from said wing for fore and aft movement relative to said wing, said wing having a rear flap pivoted thereon, a tail fixed to said wing having a tail flap pivoted thereon, means for manually shifting said tail flap to change the inclination of said wing to the horizontal, means operated by relative pivotal movement of said body and wing for shifting the rear flap of said wing, manual means for shifting the rear flap of said wing, landing wheels journaled on said car body and partially enclosed thereby, stub wings projecting laterally from said car body and having rear flaps thereon, landing skids fixed to said stub wings, and means for depressing said stub wings and landing skids; the pivotal connection between the body and the wing permitting the body and landing wheels to maintain a horizontal position when landing.

13. An airplane comprising a wing having a main section and a rear flap, a car body pivotally suspended from said main section for fore and aft movement relative to said wing, an engine fixed to said car body, the front portion of said wing having a recess therein to permit movement of the front portion of said wing relative to said engine.

14. An airplane having a supporting wing, a body pivotally supported from said wing, and means for damping relative pivotal movement of said body and supporting wing, said damping means being adjustable to vary the amount of resistance offered thereby to relative pivotal movement of said body and supporting wing.

15. In an airplane, a supporting member comprising a wing and tail, a body pivotally supported from said supporting member for fore and aft pivotal movement, adjustable means for automatically damping the relative pivotal movement of said body and supporting member, and means for locking said body and supporting member against relative pivotal movement.

In testimony whereof I have signed my name to this specification on this 8th day of September, A. D. 1927.

RUDOLPH W. SCHROEDER.